(12) United States Patent
Hatanaka et al.

(10) Patent No.: US 9,193,861 B2
(45) Date of Patent: Nov. 24, 2015

(54) COMPOSITION FOR FORMING THERMOSET FILM HAVING PHOTO-ALIGNMENT PROPERTIES

(75) Inventors: Tadashi Hatanaka, Funabashi (JP); Mitsumasa Kondo, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 139 days.

(21) Appl. No.: 13/639,529

(22) PCT Filed: Apr. 5, 2011

(86) PCT No.: PCT/JP2011/058631
§ 371 (c)(1),
(2), (4) Date: Oct. 5, 2012

(87) PCT Pub. No.: WO2011/126021
PCT Pub. Date: Oct. 13, 2011

(65) Prior Publication Data
US 2013/0021565 A1    Jan. 24, 2013

(30) Foreign Application Priority Data
Apr. 8, 2010 (JP) ................................. 2010-089477

(51) Int. Cl.
*C09K 19/00* (2006.01)
*C08L 61/28* (2006.01)
*G02F 1/13363* (2006.01)
*G02F 1/1337* (2006.01)
*G02F 1/1335* (2006.01)

(52) U.S. Cl.
CPC ........... *C08L 61/28* (2013.01); *G02F 1/133711* (2013.01); *G02F 1/13363* (2013.01); *G02F 1/133788* (2013.01); *G02F 2001/133519* (2013.01); *Y10T 428/1005* (2015.01)

(58) Field of Classification Search
CPC ....... C08L 61/28; C08L 61/32; C08K 5/0025; G02F 1/1337; G02F 1/133711; G02F 1/13378; G02F 1/133788; G02F 2001/133519; Y10T 428/10; Y10T 428/1005; Y10T 428/1036

USPC ............. 428/1.2, 1.3, 1.31, 98; 349/123, 124, 349/106; 525/509, 519; 430/321, 270, 430/271.1
See application file for complete search history.

(56) References Cited

U.S. PATENT DOCUMENTS

2012/0082805 A1 *  4/2012  Hatanaka et al. .............. 428/1.2

FOREIGN PATENT DOCUMENTS

| JP | A-9-118717 | 5/1997 |
|---|---|---|
| JP | A-9-292525 | 11/1997 |
| JP | A-2000-103937 | 4/2000 |
| JP | A-2000-119472 | 4/2000 |
| JP | A-2003-222868 | 8/2003 |
| JP | A-2005-37920 | 2/2005 |
| JP | A-2007-121721 | 5/2007 |
| JP | A-2008-217001 | 9/2008 |
| WO | WO 2010150748 A1 * | 12/2010 |

OTHER PUBLICATIONS

International Search Report issued in International Patent Application No. PCT/JP2011/058631 dated Jul. 19, 2011.

* cited by examiner

*Primary Examiner* — Ruiyun Zhang
(74) *Attorney, Agent, or Firm* — Oliff PLC

(57) ABSTRACT

There is provided a material that exhibits high solvent resistance after the formation of a cured film, excellent photo-alignment capability relative to a polymerizable liquid crystal, satisfactory heat resistance, and high transparency and moreover, that can be dissolved in a glycol-based solvent, a ketone-based solvent, or a lactic acid ester-based solvent that is applicable to the production of an overcoating of a color filter, during the formation of the cured film. A composition for forming thermoset film having photo-alignment properties and containing a component (A) that is a compound having a photo-aligning group and a hydroxy group, a component (B) that is a melamine formaldehyde resin, and a component (C) that is a crosslinker.

11 Claims, 1 Drawing Sheet

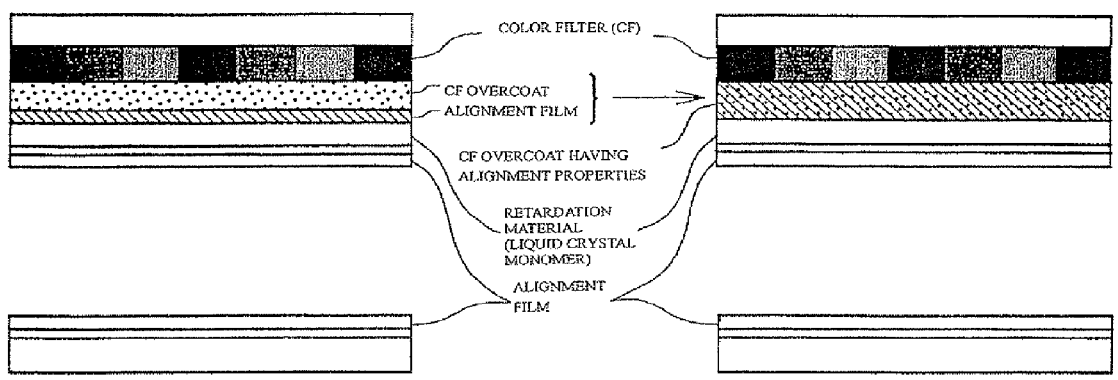
Related Art

COMPOSITION FOR FORMING THERMOSET FILM HAVING PHOTO-ALIGNMENT PROPERTIES

TECHNICAL FIELD

The present invention relates to a composition for forming thermoset film having photo-alignment properties and a cured film formed from the same. More in detail, the present invention relates to a composition for forming thermoset film having high transparency, liquid crystal alignment capability, high solvent resistance, and heat resistance as a thermoset film formed therefrom, and the application of the composition to the thermoset film. The composition for forming thermoset film having photo-alignment properties of the present invention is particularly suitable for a color filter overcoating agent serving also as a polymerizable liquid crystal alignment function for forming a built-in retardation layer in a liquid crystal display.

BACKGROUND ART

Generally, in an optical device such as a liquid crystal display element, an organic EL (electro luminescent) element, and a solid-state image sensor, in order to prevent the element surface from being exposed to a solvent or heat during the production process thereof, a protective film is provided. For the protective film, there are required not only having high adhesion with a substrate to be protected and having high solvent resistance, but also being excellent in performance such as heat resistance.

In addition, in the case where such a protective film is used as a protective film of a color filter used in a color liquid crystal display device or a solid-state image sensor, in order to maintain the transmittance of light transmitting a color filter, the protective film is required to have high transparency.

In recent years, cost reduction and weight reduction by introducing a retardation material into a cell of a liquid crystal display have been studied and as such a retardation material, there is generally used a material prepared by applying a polymerizable liquid crystal solution to a substrate to align the solution and by photo-curing the resultant coating. For aligning the retardation material, an underlayer film thereof is necessary to be a material having alignment properties after the underlayer film has been subjected to a rubbing process or a polarized UV irradiation. Therefore, the retardation material is formed on a liquid crystal alignment layer film formed on an overcoating of a color filter. (see FIG. 1(*a*)). If a film serving as both this liquid crystal alignment layer and the overcoating of the color filter (see FIG. 1(*b*)) can be formed, large advantages such as the reduction of the cost and the reduction of the number of the processes can be obtained, so that a material capable of serving as both the liquid crystal alignment layer and the overcoating is strongly desired.

Generally, for the overcoating of the color filter, an acrylic resin having high transparency is used. Then, for dissolving the acrylic resin, there are widely used a glycol-based solvent such as propylene glycol monomethyl ether and propylene glycol monomethyl ether acetate; an ester solvent such as ethyl lactate and butyl lactate; and a ketone solvent such as cyclohexanone and methyl amyl ketone from the viewpoint of handling properties and coatability. With respect to the acrylic resin, there is taken a technique for enhancing heat resistance and solvent resistance of the acrylic resin by thermo-curing or photo-curing the acrylic resin (Patent Documents 1 and 2). However, although a conventional thermo-curable or photo-curable acrylic resin has appropriate transparency or solvent resistance, even when an overcoating formed from such an acrylic resin is subjected to a rubbing process or a polarized UV irradiation, satisfactory alignment properties cannot be obtained.

For the liquid crystal alignment layer, a material containing a solvent-soluble polyimide or polyamic acid is usually used. It is disclosed that such a material is completely imidated by being postbaked, so that solvent resistance becomes imparted to the material and by being subjected to a rubbing process, the material becomes a material exhibiting satisfactory alignment properties (Patent Document 3).

It is disclosed that by irradiating an acrylic resin having in a side chain thereof, a photodimerized moiety such as a cinnamoyl group and a calcone group with polarized UV, satisfactory liquid crystal alignment properties can be exhibited (Patent Document 4).

Furthermore, there is disclosed a liquid crystal aligning agent containing a polymerizable component having a structure to be crosslinked by being heated (Patent Document 5).

RELATED-ART DOCUMENTS

Patent Documents

Patent Document 1: Japanese Patent Application Publication No. 2000-103937 (JP 2000-103937 A)
Patent Document 2: Japanese Patent Application Publication No. 2000-119472 (JP 2000-119472 A)
Patent Document 3: Japanese Patent Application Publication No. 2005-037920 (JP 2005-037920 A)
Patent Document 4: Japanese Patent Application Publication No. 9-118717 (JP 9-118717 A)
Patent Document 5: Japanese Patent Application Publication No. 2003-222868 (JP 2003-222868 A)

SUMMARY OF THE INVENTION

Problem to be Solved by the Invention

The liquid crystal alignment layer described in Patent Document 3 has a problem in that although the liquid crystal alignment layer can obtain solvent resistance and alignment properties, the liquid crystal alignment layer has low transparency for being used as an overcoating material of a color filter. In addition, although polyimide and polyamic acid are soluble in a solvent such as N-methylpyrrolidone and γ-butyrolactone, they have low solubility in a glycol-based solvent, an ester solvent, and a ketone solvent, so that the liquid crystal alignment layer described in Patent Document 3 has difficulty in being applied to an overcoating production line using such a solvent.

In the technology described in Patent Document 4, when the degree of the photodimerization by the polarized light irradiation is low, intermixing is caused during the application of a polymerizable liquid crystal that is a retardation material, which leads to an alignment failure, so that a considerable exposure dose is necessary.

In the liquid crystal aligning agent described in Patent Document 5, although several percent of an epoxy-based crosslinker is added as a structure crosslinking by being heated for enhancing tilt stability of the liquid crystal, in the polymer (polymerizable component) itself, there is no moiety reacted with an epoxy group. Therefore, also in the case of using a polymerizable liquid crystal as a retardation material, when the degree of the photodimerization is low, intermixing is caused during the application of the polymerizable liquid crystal, which leads to an alignment failure, so that a considerable exposure dose is necessary.

In the technology of imparting liquid crystal alignment properties by irradiating with light, only by irradiating the liquid crystal alignment layer with polarized UV in an usual exposure dosage (for example, 100 mJ/cm$^2$), the photodimerization reactivity is low and the liquid crystal alignment layer is not satisfactorily crosslinked, so that solvent resistance and heat resistance of the liquid crystal alignment layer are low. Therefore, when a polymerizable liquid crystal is applied onto the liquid crystal alignment layer for forming a retardation material layer thereon, the liquid crystal alignment layer is dissolved in the polymerizable liquid crystal, so that the retardation material layer cannot obtain satisfactory alignment properties.

When the exposure dosage is enlarged to 1 J/cm$^2$ or more in order to enhance the photodimerization reactivity, alignment properties of the polymerizable liquid crystal are enhanced; however, the exposure time is extremely long, and such a method cannot be practical.

Furthermore, in materials used in a conventional liquid crystal alignment layer, only a photodimerized moiety serves as a crosslinked moiety, so that the number of crosslinked moieties is small as a whole and the produced liquid crystal alignment layer does not have satisfactory heat resistance. Therefore, during the production process of a display element performed at 200° C. or more after the formation of the retardation material, it is also feared that the liquid crystal alignment layer is largely contracted.

The present invention has been invented under the circumstances described above and the problem to be solved by the present invention is to provide a material that exhibits high solvent resistance after the formation of a cured film, excellent photo-alignment capability relative to a polymerizable liquid crystal, satisfactory heat resistance, and high transparency and moreover, that can be dissolved in a glycol-based solvent, a ketone solvent, or a lactic acid ester solvent that are applicable to the production of an overcoating of a color filter, during the formation of the cured film.

Means for Solving the Problem

As a result of assiduous research intended to overcome these disadvantages, the inventors of the present invention have achieved the present invention.

That is, the present invention relates to, as a first aspect, a composition for forming thermoset film having photo-alignment properties and containing a component (A) that is a compound having a photo-aligning group and a hydroxy group, a component (B) that is a melamine formaldehyde resin, and a component (C) that is a crosslinker.

as a second aspect, the composition for forming thermoset film having photo-alignment properties according to the first aspect in which the photo-aligning group of the component (A) is a moiety to be photodimerized or photoisomerized, as a third aspect, the composition for forming thermoset film having photo-alignment properties according to the first aspect or the second aspect in which the photo-aligning group of the component (A) is a cinnamoyl group, as a fourth aspect, the composition for forming thermoset film having photo-alignment properties according to the first aspect or the second aspect in which the photo-aligning group of the component (A) is an azobenzene moiety, as a fifth aspect, the composition for forming thermoset film having photo-alignment properties according to any one of the first aspect to the fourth aspect in which the component (B) is a melamine formaldehyde resin having an alkoxymethylol group, as a sixth aspect, the composition for forming thermoset film having photo-alignment properties according to any one of the first aspect to the fifth aspect in which the crosslinker as the component (C) is a crosslinker having a methylol group or an alkoxymethylol group, as a seventh aspect, the composition for forming thermoset film having photo-alignment properties according to any one of the first aspect to the sixth aspect, further containing as a component (D), an acid or a thermo-acid generator, as an eighth aspect, the composition for forming thermoset film having photo-alignment properties according to any one of the first aspect to the seventh aspect, further containing as a component (B), a sensitizer, as a ninth aspect, the composition for forming thermoset film having photo-alignment properties according to any one of the first aspect to the eighth aspect in which the ratio between the component (A) and the component (B) is 5:95 to 60:40 in a mass ratio, as a tenth aspect, the composition for forming thermoset film having photo-alignment properties according to any one of the first aspect to the ninth aspect, in which 10 to 100 parts by mass of the component (C), based on 100 parts by mass of the total amount of the component (A) and the component (B), is contained, as an eleventh aspect, the composition for forming thermoset film having photo-alignment properties according to any one of the seven aspect to the first aspect, in which 0.01 to 5 parts by mass of the component (D), based on 100 parts by mass of the total amount of the component (A) and the component (B), is contained, as a twelfth aspect, the composition for forming thermoset film having photo-alignment properties according to any one of the eighth aspect to the eleventh aspect, in which 0.1 to 20 parts by mass of the component (B), based on 100 parts by mass of the total amount of the component (A) and the component (B), is contained, as a thirteenth aspect, a liquid crystal alignment layer obtained using the composition for forming thermoset film having photo-alignment properties according to any one of the first aspect to the twelfth aspect, and according to a fourteenth aspect, an optical device containing a layer serving as both a liquid crystal alignment layer obtained using the composition for forming thermoset film having photo-alignment properties according to any one of the first aspect to the twelfth aspect and a color filter overcoating, and a retardation layer.

Effects of the Invention

The composition for forming thermoset film having photo-alignment properties of the present invention can form a cured film having besides high transparency, high solvent resistance, and high heat resistance, liquid crystal alignment capability by light irradiation (photo-alignment properties). Then, therefore, the composition for forming thermoset film having photo-alignment properties of the present invention can be suitably used as a material for forming a photo-aligning liquid crystal alignment film and a photo-aligning overcoating.

The composition for forming thermoset film having photo-alignment properties of the present invention can form a cured film possessing the above-described performances, so that the composition can be used to simultaneously form a layer in which a polymerizable liquid crystal is aligned for forming a retardation material in a cell of a display and an overcoating layer of a color filter, that is, the composition can be used to form a "polymerizable liquid crystal alignment layer" providing the characteristics of both of the above-described layers, so that it is possible to achieve a cost reduction by the simplification of the production process and the reduction of the number of processes.

Furthermore, the composition for forming thermoset film having photo-alignment properties of the present invention is soluble in a glycol-based solvent, a ketone solvent, and a lactic acid ester solvent, so that the composition can be suitably used in a production line of an overcoating of a color filter using mainly such solvents.

BRIEF DESCRIPTION OF THE DRAWINGS

FIG. 1 is a model diagram showing the contrast of a liquid crystal cell (b) in which a color filter (CF) overcoating having alignment properties is formed using the composition for forming thermoset film having photo-alignment properties of the present invention with a liquid crystal cell (a) in which a liquid crystal alignment film is formed by a conventional technology.

MODES FOR CARRYING OUT THE INVENTION

The present invention has characteristics in terms of, besides the transparency, solvent resistance, and heat resistance mentioned above, enhanced performance of the liquid crystal alignment capability by light irradiation (photo-alignment properties). That is, the present invention relates to a composition for forming thermoset film having photo-alignment properties and containing a compound having a photo-aligning group and a hydroxy group that is the component (A), a melamine formaldehyde resin that is the component (B), and a crosslinker that is the component (C).

Furthermore, the present invention relates to a composition for forming thermoset film having photo-alignment properties capable of containing besides the component (A), the component (B), and the component (C), and if desired, an acid or a therm-acid generator as a component (D) and furthermore, a sensitizer as a component (E).

Here, in the present invention, the thermoset film having photo-alignment properties refers to a cured film in which optical anisotropy is induced by being irradiated with linearly polarized light and that is cured by being heated.

Details of each component will be described hereinafter.

Component (A)

The component (A) is a compound having a photo-aligning group and a hydroxy group.

In the present invention, the photo-aligning group refers to a functional group (moiety) to be photodimerized or photoisomerized.

The photodimerized moiety is a moiety forming a dimer by being irradiated with light and specific examples thereof include a cinnamoyl group, a calcone group, a coumarin group, and an anthracene group. Among them, preferred is a cinnamoyl group having high transparency in a visible light region and photodimerization reactivity.

In addition, the photoisomerized moiety is a moiety in which a cis form and a trans form are converted by being irradiated with light and specific examples thereof include a moiety containing an azobenzene and a stilbene. Among them, in terms of high reactivity, the azobenzene is preferred.

Examples of compounds having a photo-aligning group and a hydroxy group include a compound of the formulae:

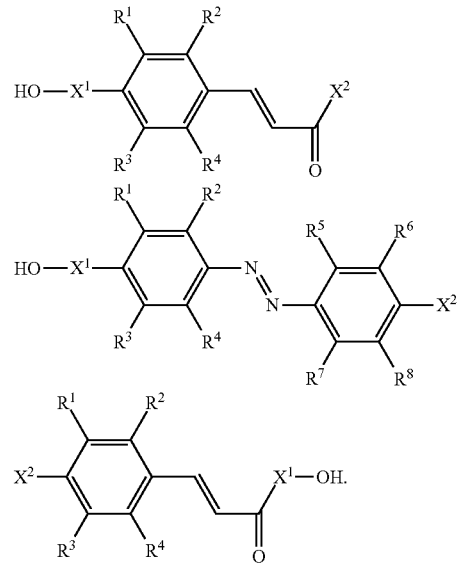

In the formulae, $X^1$ is a single bond or is a $C_{1-18}$ alkylene group, a phenylene group, a biphenylene group, or a cyclohexylene group bonded through a covalent bond, an ether bond, an ester bond, an amide bond, an amino bond, or a urea bond.

The alkylene group, the phenylene group, and the biphenylene group are optionally substituted with one or more substituent(s) the same as or different from each other that is(are) selected from a halogen atom and a cyano group.

$X^2$ is a hydrogen atom, a cyano group, a nitro group, a $C_{1-18}$ alkyl group, a phenyl group, or a biphenyl group.

The $C_{1-18}$ alkyl group, the phenyl group, the biphenyl group, or the cyclohexyl group is optionally bonded to an adjacent carbonyl group or phenylene group through a covalent bond, an ether bond, an ester bond, an amide bond, an amino bond, or a urea bond and the phenyl group and the biphenyl group are optionally substituted with any one of a halogen atom and a cyano group.

$R^1$, $R^2$, $R^3$, $R^4$, $R^5$, $R^6$, $R^7$, and $R^8$ are independently a hydrogen atom, a $C_{1-4}$ alkyl group, a $C_{1-4}$ alkoxy group, a halogen atom, a trifluoromethyl group, or a cyano group.

Specific examples of the compound having a photo-aligning group and a hydroxy group include 4-(8-hydroxyoctyloxy)cinnamic acid methyl ester, 4-(6-hydroxyhexyloxy)cinnamic acid methyl ester, 4-(4-hydroxybutyloxy)cinnamic acid methyl ester, 4-(3-hydroxypropyloxy)cinnamic acid methyl ester, 4-(2-hydroxyethyloxy)cinnamic acid methyl ester, 4-hydroxymethyloxycinnamic acid methyl ester, 4-hydroxycinnamic acid methyl ester, 4-(8-hydroxyoctyloxy)cinnamic acid ethyl ester, 4-(6-hydroxyhexyloxy)cinnamic acid ethyl ester, 4-(4-hydroxybutyloxy)cinnamic acid ethyl ester, 4-(3-hydroxypropyloxy)cinnamic acid ethyl ester, 4-(2-hydroxyethyloxy)cinnamic acid ethyl ester, 4-hydroxymethyloxycinnamic acid ethyl ester, 4-hydroxycinnamic acid ethyl ester, 4-(8-hydroxyoctyloxy)cinnamic acid phenyl ester, 4-(6-hydroxyhexyloxy)cinnamic acid phenyl ester, 4-(4-hydroxybutyloxy)cinnamic acid phenyl ester, 4-(3-hydroxypropyloxy)cinnamic acid phenyl ester, 4-(2-hydroxyethyloxy)

cinnamic acid phenyl ester, 4-hydroxymethyloxycinnamic acid phenyl ester, 4-hydroxycinnamic acid phenyl ester, 4-(8-hydroxyoctyloxy)cinnamic acid biphenyl ester, 4-(6-hydroxyhexyloxy)cinnamic acid biphenyl ester, 4-(4-hydroxybutyloxy)cinnamic acid biphenyl ester, 4-(3-hydroxypropyloxy)cinnamic acid biphenyl ester, 4-(2-hydroxyethyloxy)cinnamic acid biphenyl ester, 4-hydroxymethyloxycinnamic acid biphenyl ester, 4-hydroxycinnamic acid biphenyl ester, cinnamic acid 8-hydroxyoctyl ester, cinnamic acid 6-hydroxyhexyl ester, cinnamic acid 4-hydroxybutyl ester, cinnamic acid 3-hydroxypropyl ester, cinnamic acid 2-hydroxyethyl ester, cinnamic acid hydroxymethyl ester, 4-(8-hydroxyoctyloxy)azobenzene, 4-(6-hydroxyhexyloxy)azobenzene, 4-(4-hydroxybutyloxy)azobenzene, 4-(3-hydroxypropyloxy)azobenzene, 4-(2-hydroxyethyloxy)azobenzene, 4-hydroxymethyloxyazobenzene, 4-hydroxyazobenzene, 4-(8-hydroxyoctyloxy)calcone, 4-(6-hydroxyhexyloxy)calcone, 4-(4-hydroxybutyloxy)calcone, 4-(3-hydroxypropyloxy)calcone, 4-(2-hydroxyethyloxy)calcone, 4-hydroxymethyloxycalcone, 4-hydroxycalcone, 4'-(8-hydroxyoctyloxy)calcone, 4'-(6-hydroxyhexyloxy)calcone, 4'-(4-hydroxybutyloxy)calcone, 4'-(3-hydroxypropyloxy)calcone, 4'-(2-hydroxyethyloxy)calcone, 4'-hydroxymethyloxycalcone, 4'-hydroxycalcone, 7-(8-hydroxyoctyloxy)coumarin, 7-(6-hydroxyhexyloxy) coumarin, 7-(4-hydroxybutyloxy)coumarin, 7-(3-hydroxypropyloxy)coumarin, 7-(2-hydroxyethyloxy)coumarin, 7-hydroxymethyloxycoumarin, 7-hydroxycoumarin, 6-hydroxyoctyloxycoumarin, 6-hydroxyhexyloxycoumarin, 6-(4-hydroxybutyloxy)coumarin, 6-(3-hydroxypropyloxy) coumarin, 6-(2-hydroxyethyloxy)coumarin, 6-hydroxymethyloxycoumarin, and 6-hydroxycoumarin, to which the specific examples are not limited.

In the present invention, the compound as the component (A) may be a mixture of compounds of the component (A).

Component (B)

The component (B) is a melamine formaldehyde resin.

In the present invention, the melamine formaldehyde resin refers to a resin obtained by condensation-polymerizing melamine and formaldehyde.

Preferred examples of the melamine formaldehyde resin include a resin having a unit structure of formula:

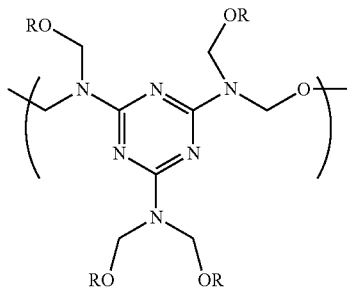

In the formula, R is a hydrogen atom or a $C_{1-4}$ alkyl group.

In the melamine formaldehyde resin as the component (B), from the viewpoint of the preservation stability of the resin, a methylol group generated during the condensation-polymerization of melamine and formaldehyde is preferably alkylated to be converted into an alkoxymethylol group (R is a $C_{1-4}$ alkyl group).

Although the method for obtaining the melamine formaldehyde resin as the component (B) is not particularly limited, the melamine formaldehyde resin is generally prepared by a method including: mixing melamine with formaldehyde; rendering the resultant mixture weak alkaline using sodium carbonate, ammonia, or the like; and heating the mixture at 60 to 100° C. Furthermore, by reacting the melamine formaldehyde resin with an alcohol, the methylol group can be alkoxylated.

The melamine formaldehyde resin as the component (B) has a number average molecular weight (Mn) of preferably 250 to 5,000, more preferably 300 to 4,000, further more preferably 350 to 3,500. When the number average molecular weight is more than 5,000 to be excessively large, the solubility of the resin relative to a solvent decreases, so that the handling property thereof may be lowered. When the number average molecular weight is less than 250 to be excessively small, a lack of curing is caused during thermo-curing of the resin, so that solvent resistance and heat resistance of the resin may decrease.

In the present invention, the melamine formaldehyde resin as the component (B) may be used in any form of a liquid form and a solution form prepared by redissolving a purified liquid of the melamine formaldehyde resin in a solvent described later.

In the present invention, the melamine formaldehyde resin as the component (B) may be a mixture of a plurality of types of melamine formaldehyde resin of the component (B).

Component (C)

The component (C) of the present invention is a crosslinker bonded with a hydroxy group of the compound as the component (A) and a methylol group or an alkoxymethylol group contained in the component (B).

Examples of the crosslinker as the component (C) include an epoxy compound, a methylol compound, and an isocyanate compound, and preferred is a methylol compound having a methylol group or an alkoxymethylol group.

Specific examples of the methylol compound include compounds such as alkoxymethylated glycoluril, alkoxymethylated benzoguanamine, and alkoxymethylated melamine.

Specific examples of alkoxymethylated glycoluril include 1,3,4,6-tetrakis(methoxymethyl)glycoluril, 1,3,4,6-tetrakis(butoxymethyl)glycoluril, 1,3,4,6-tetrakis(hydroxymethyl) glycoluril, 1,3-bis(hydroxymethyl)urea, 1,1,3,3-tetrakis(butoxymethyl)urea, 1,1,3,3-tetrakis(methoxymethyl)urea, 1,3-bis(hydroxymethyl)-4,5-dihydroxy-2-imidazolinone, and 1,3-bis(methoxymethyl)-4,5-dimethoxy-2-imidazolinone. Examples of the commercially available product thereof include: a glycoluril compound (manufactured by Mitsui Cytec Ltd. (present: Nihon Cytec Industries, Inc.); trade name: Cymel 1170, and Powderlink 1174); a methylated urea resin (manufactured by Mitsui Cytec Ltd. (present: Nihon Cytec Industries, Inc.); trade name: UFR 65); a butylated urea resin (manufactured by Mitsui Cytec Ltd. (present: Nihon Cytec Industries, Inc.); trade name: UFR 300, U-VAN10S60, U-VAN10R, and U-VAN11HV); and a urea/formaldehyde-based resin (manufactured by DIC Corporation; trade name: Beckamine J-300S, Beckamine P-955, and Beckamine N; highly condensed-type).

Specific examples of alkoxymethylated benzoguanamine include tetramethoxymethyl benzoguanamine. Examples of the commercially available product thereof include a product (manufactured by Mitsui Cytec Ltd. (present: Nihon Cytec Industries, Inc.); trade name: Cymel 1123) and a product (manufactured by Sanwa Chemical Co., Ltd.; trade name: NIKALAC BX-4000, NIKALAC BX-37, NIKALAC BL-60, and NIKALAC BX-55H).

Specific examples of alkoxymethylated melamine include hexamethoxymethyl melamine. Examples of the commercially available product thereof include a methoxymethyl-type melamine compound (manufactured by Mitsui Cytec Ltd. (present: Nihon Cytec Industries, Inc.); trade name: Cymel 300, Cymel 301, Cymel 303, and Cymel 350), a butoxymethyl-type melamine compound (manufactured by Mitsui Cytec Ltd. (present: Nihon Cytec Industries, Inc.); trade name: Mycoat 506, and Mycoat 508), a methoxymethyl-type melamine compound (manufactured by Sanwa Chemical Co., Ltd.; trade name: NIKALAC MW-30, NIKALAC MW-22, NIKALAC MW-11, NIKALAC MS-001, NIKALAC MX-002, NIKALAC MX-730, NIKALAC MX-750, and NIKALAC MX-035), and a butoxymethyl-type melamine compound (manufactured by Sanwa Chemical Co., Ltd.; trade name: NIKALAC MX-45, NIKALAC MX-410, and NIKALAC MX-302).

Furthermore, as the crosslinker of the component (C), there can also be used a polymer produced using an acrylamide compound or a methacrylamide compound that are substituted with a hydroxymethyl group or an alkoxymethyl group such as N-hydroxymethylacrylamide, N-methoxymethylmethacrylamide, N-ethoxymethylacrylamide, and N-butoxymethylacrylamide.

Examples of such a polymer include a poly(N-butoxymethylacrylamide), a copolymer of N-butoxymethylacrylamide with styrene, a copolymer of N-hydroxymethylmethacrylamide with methyl methacrylate, a copolymer of N-ethoxymethylmethacrylamide with benzyl methacrylate, and a copolymer of N-butoxymethylacrylamide, benzyl methacrylate, and 2-hydroxypropyl methacrylate. The weight average molecular weight (Mw) of such a polymer is 1,000 to 500,000, preferably 2,000 to 200,000, more preferably 3,000 to 150,000, further preferably 3,000 to 50,000.

These crosslinkers as the component (C) may be used individually or in combination of two or more types thereof.

The content of the crosslinker as the component (C) in the composition for forming thermoset film having photo-alignment properties of the present invention is preferably 10 to 100 parts by mass, more preferably 15 to 80 parts by mass, based on 100 parts by mass of the total amount of the compound having a photo-aligning group and a hydroxy group as the component (A) and the melamine formaldehyde resin as the component (B). When the content of the crosslinker is excessively small, solvent resistance and heat resistance of the cured film obtained from the composition for forming thermoset film having photo-alignment properties decrease and the sensitivity thereof during photo-alignment is lowered. When the content of the crosslinker is excessively large, photo-alignment properties and preservation stability of the cured film may be lowered.

Component (D)

In the present invention, the composition for forming thermoset film may contain besides the components (A) to (C), if desired, an acid or a thermo-acid generator as the component (D). The component (D) is effective for accelerating a thermo-curing reaction of the composition for forming thermoset film having photo-alignment properties of the present invention.

The component (D) is not particularly limited so long as the component (D) is as an acid, a sulfonic acid group-containing compound, hydrochloric acid, or a salt thereof, or as a thermo-acid generator, a compound generating an acid by being thermally decomposed during prebaking or postbaking, that is, a compound generating an acid by being thermally decomposed at a temperature of 80° C. to 250° C.

Specific examples of the acid include: hydrochloric acid; sulfonic acid such as methanesulfonic acid, ethanesulfonic acid, propanesulfonic acid, butanesulfonic acid, pentanesulfonic acid, octanesulfonic acid, benzenesulfonic acid, p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H,1H,2H,2H-perfluorooctanesulfonic acid, perfluoro (2-ethoxyethane)sulfonic acid, pentafluoroethanesulfonic acid, nonafluorobutane-1-sulfonic acid, and dodecylbenzenesulfonic acid; and a hydrate or a salt thereof.

Specific examples of the compound generating an acid by being heated include bis(tosyloxy)ethane, bis(tosyloxy)propane, bis(tosyloxy)butane, p-nitrobenzyl tosylate, o-nitrobenzyl tosylate, 1,2,3-phenylene tris(methylsulfonate), p-toluenesulfonic acid pyridinium salt, p-toluenesulfonic acid morphonium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-toluenesulfonate, N-ethyl-p-toluenesulfonamide, and compounds of formulae:

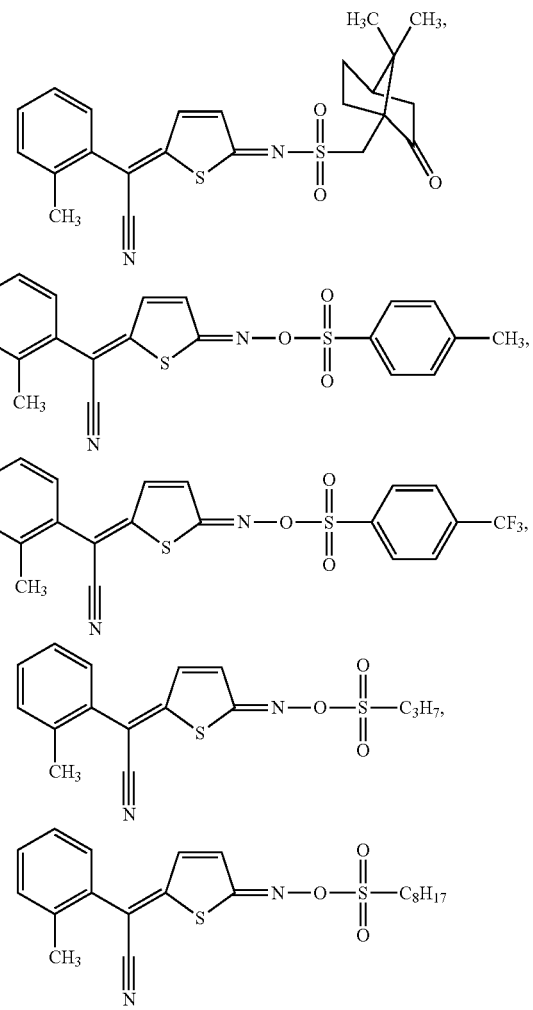

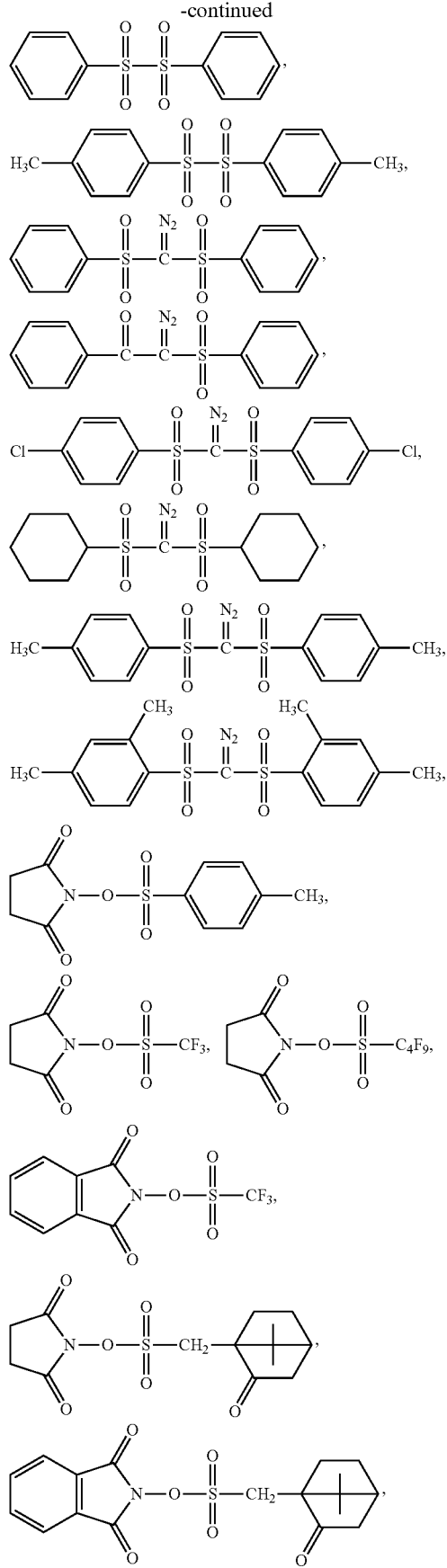
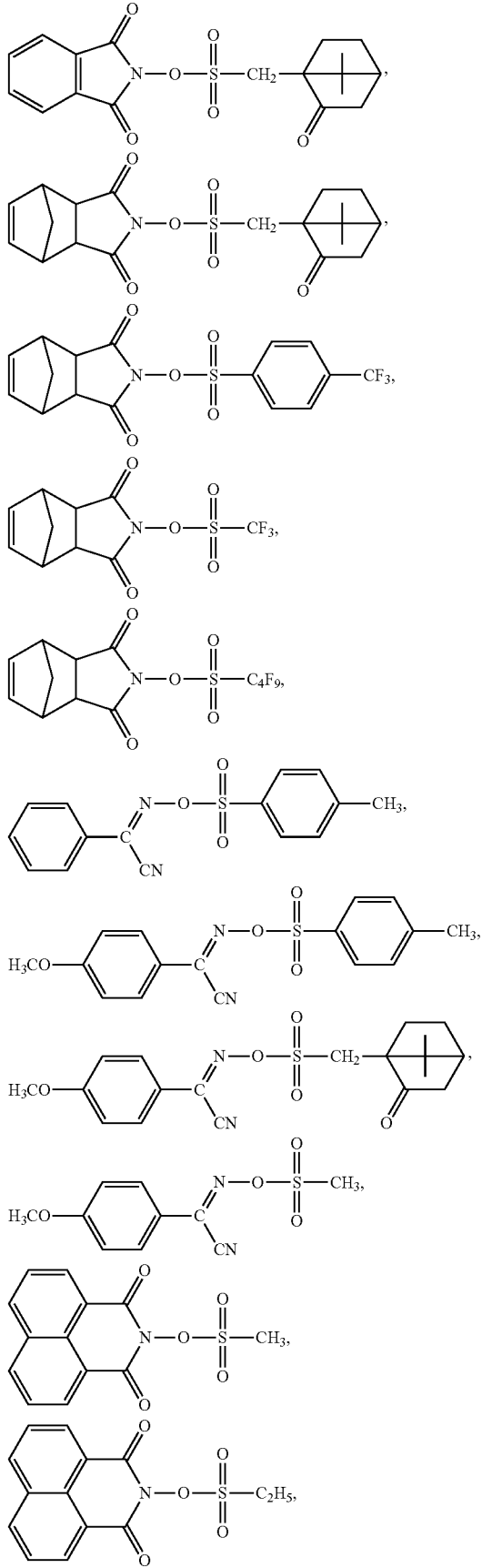

-continued

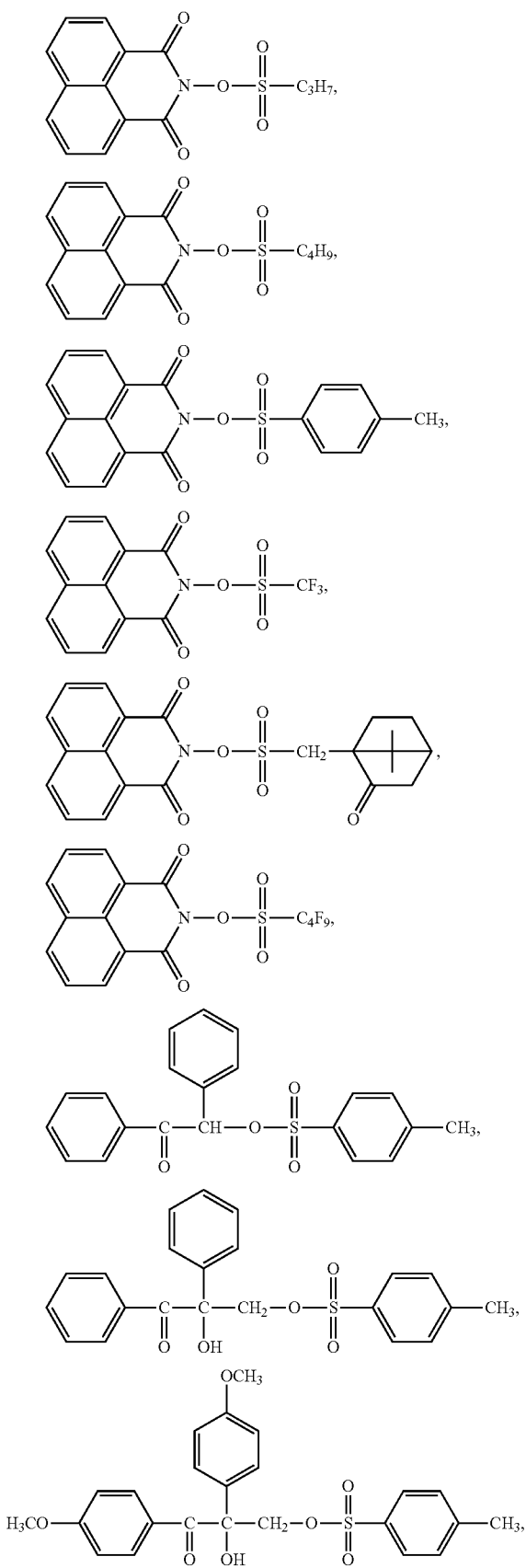

-continued

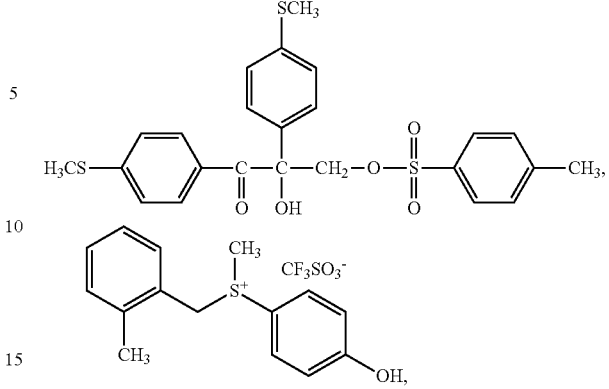

The content of the component (D) in the composition for forming thermoset film having photo-alignment properties of the present invention is preferably 0.01 to 5 parts by mass, more preferably 0.05 to 4 parts by mass, further preferably 0.1 to 2 parts by mass, relative to 100 parts by mass of the total amount of the compound having a photo-aligning group and a hydroxy group as the component (A) and the melamine formaldehyde resin as the component (B). By blending the component (D) in a content of 0.01 parts by mass or more in the composition, satisfactory thermo-curability and satisfactory solvent resistance can be imparted to the composition and furthermore, high sensitivity relative to light irradiation can also be imparted to the composition. However, when the content of the component (D) is more than 5 parts by mass, the preservation stability of the composition may be lowered.

Component (E)

In the present invention, if desired further, the composition may contain a sensitizer as the component (E). The component (E) is effective for accelerating the photodimerization reaction after the formation of the thermoset film of the present invention.

Examples of the sensitizer as the component (E) include benzophenone, anthracene, anthraquinone, thioxanthone, derivatives of these compounds, and a nitrophenyl compound. Among them, a benzophenone derivative and a nitrophenyl compound are preferred.

Specific examples of the preferred compound as the component (E) include N,N-diethylaminobenzophenone, 2-nitrofluorene, 2-nitrofluorenone, 5-nitroacenaphthene, 4-nitrobiphenyl, 4-nitrocinnamic acid, 4-nitrostilbene, 4-nitrobenzophenone, and 5-nitroindole. Particularly, N,N-diethylaminobenzophenone, which is a derivative of benzophenone, is preferred.

Examples of the sensitizer are not limited to the above-described examples. The sensitizers may be used individually or in combination of two or more types thereof.

The used ratio of the sensitizer as the component (E) in the present invention is preferably 0.1 to 20 parts by mass, more preferably 0.2 to 10 parts by mass, relative to 100 parts by mass of the total mass of the compound having a photo-aligning group and a hydroxy group as the component (A) and the melamine formaldehyde resin as the component (B). When the ratio is excessively small, the effect as the sensitizer cannot satisfactorily be obtained. When the ratio is excessively large, lowering of the transmittance and roughness of the coating film may be caused.

Solvent

The composition for forming thermoset film having photo-alignment properties of the present invention is mainly used in a solution state in which the composition is dissolved in a solvent. The type and the structure of the solvent used at this time are not particularly limited so long as the solvent can dissolve the component (A), the component (B), and the component (C), and if necessary, the component (D), the component (E) and/or other additives described later.

Specific examples of the solvent include ethylene glycol monomethyl ether, ethylene glycol monoethyl ether, methylcellosolve acetate, ethylcellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, toluene, xylene, methyl ethyl ketone, cyclopentanone, cyclohexanone, 2-butanone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, N,N-dimethylformamide, N,N-dimethylacetamide, and N-methyl-2-pyrrolidone.

These solvents may be used individually or in combination of two or more types thereof. Among these solvents, propylene glycol monomethyl ether, propylene glycol monomethyl ether acetate, cyclohexanone, 2-heptanone, propylene glycol propyl ether, propylene glycol propyl ether acetate, ethyl lactate, butyl lactate, methyl 3-methoxypropionate, ethyl 3-methoxypropionate, ethyl 3-ethoxypropionate, and methyl 3-ethoxypropionate can be applied to the production line of an overcoating of a color filter and have advantageous film-formation property and high safety, so that they are more preferred.

Other Additives

Furthermore, the composition for forming thermoset film having photo-alignment properties of the present invention may contain, so long as not impairing the effect of the present invention and if necessary, a slime coupling agent, a surfactant, a rheology adjusting agent, a pigment, a dye, a preservation stabilizer, an antifoamer, an antioxidant, and the like.

Composition for Forming Thermoset Film Having Photo-Alignment Properties

The composition for forming thermoset film having photo-alignment properties of the present invention is a composition containing the compound having a photo-aligning group and a hydroxy group as the component (A), the melamine formaldehyde resin as the component (B), and the crosslinker as the component (C) and capable of containing, if desired, one or more type(s) of the acid or the thermo-acid generator as the component (D), the sensitizer as the component (E), and further, other additives. Then, usually, these components are used as a solution form in which these components are dissolved in a solvent.

The blending ratio between the component (A) and the component (B) is preferably 5:95 to 60:40 in a mass ratio. When the content of the component (B) is excessive, the liquid crystal alignment properties of the composition are lowered easily. When the content of the component (B) is lower, the solvent resistance of the composition decreases and consequently, the alignment properties of the composition are lowered easily.

Preferred examples of the composition for forming thermoset film having photo-alignment properties of the present invention are as follows.

[1]: The composition for forming thermoset film having photo-alignment properties in which the blending ratio between the component (A) and the component (B) is 5:95 to 60:40 in a mass ratio, and 5 to 100 parts by mass of the component (C), based on 100 parts by mass of the total amount of the component (A) and the component (B), is contained.

[2]: The composition for forming thermoset film having photo-alignment properties in which the blending ratio between the component (A) and the component (B) is 5:95 to 60:40 in a mass ratio, and 5 to 100 parts by mass of the component (C), based on 100 parts by mass of the total amount of the component (A) and the component (B), and a solvent are contained.

[3]: The composition for forming thermoset film having photo-alignment properties in which the blending ratio between the component (A) and the component (B) is 5:95 to 60:40 in a mass ratio, and 5 to 100 parts by mass of the component (C), 0.01 to 5 parts by mass of the component (D), based on 100 parts by mass of the total amount of the component (A) and the component (B), and a solvent are contained.

[4]: The composition for forming thermoset film having photo-alignment properties in which the blending ratio between the component (A) and the component (B) is 5:95 to 60:40 in a mass ratio, and 5 to 100 parts by mass of the component (C), 0.01 to 5 parts by mass of the component (D), 0.1 to 20 parts by mass of the component (E), based on 100 parts by mass of the total amount of the component (A) and the component (B), and a solvent are contained.

The blending ratio, the preparing method, and the like when the composition for forming thermoset film having photo-alignment properties of the present invention is used as a solution, are described in detail below.

Although the content of the solid content in the composition for forming thermoset film having photo-alignment properties of the present invention is not particularly limited so long as each component of the composition is homogeneously dissolved in a solvent, the content is 1 to 80% by mass, preferably 3 to 60% by mass, more preferably 5 to 40% by mass. Here, the solid content refers to a component remaining after subtracting the solvent from the whole component of the composition for forming thermoset film having photo-alignment properties.

The preparing method of the composition for forming thermoset film having photo-alignment properties of the present invention is not particularly limited. Examples of the preparing method include: a method including mixing the component (A), the component (B), the component (C), and further the component (D) and the component (E) in predetermined mixing ratios in a solvent to prepare a homogeneous solution; and a method including this preparing method and further adding, in an appropriate stage if necessary, other additives to be mixed in the resultant mixture.

The prepared solution of the composition for forming thermoset film having photo-alignment properties is preferably filtered using a filter having a pore diameter of around 0.2 μm to be used.

Coating Film, Cured Film, and Liquid Crystal Alignment Layer

By a method including: applying the solution of the composition for forming thermoset film having photo-alignment properties, which is one aspect of the present invention, onto a substrate (for example, a silicon/silicon dioxide coated substrate, a silicon nitride substrate, a substrate coated with a metal such as aluminum, molybdenum, and chromium, a glass substrate, a quartz substrate, an ITO substrate, and the like), a film (for example, a resin film such as a triacetylcellulose film, a polyester film, and an acrylic film), or the like by rotation coating, flow coating, roll coating, slit coating, slit coating followed by rotation coating, inkjet coating, printing, or the like; and then, predrying (prebaking) the resultant coating on a hot plate or in an oven, a coating film can be formed. Then, by subjecting the coating film to a heating treatment (postbaking), a cured film is formed.

As the conditions for prebaking, a heating temperature and a heating time accordingly selected from the ranges of the temperatures 70° C. to 140° C. and the times 0.4 to 60 minutes are adopted. The heating temperature and the heating time are preferably 80° C. to 130° C. and 0.5 to 10 minutes, respectively.

As the postbaking, there is adopted, for example, a method in which the coating film is subjected to a heating treatment at a heating temperature selected from a range of the temperatures 100° C. to 250° C. for 1 to 30 minute(s) in the case of on a hot plate, for 5 to 90 minutes in the case of in an oven.

The film thickness of the cured film formed using the thermoset composition having photo-alignment properties of the present invention is, for example, 0.06 to 30 μm and can be accordingly selected by considering the level difference and the optical and electrical properties of the used substrate.

By curing the composition for forming thermoset film having photo-alignment properties of the present invention under the above-mentioned conditions, the level difference of the substrate can be satisfactorily covered and a cured film having high transparency can be formed.

By irradiating the thus formed thermoset film having photo-alignment properties with polarized UV, the thermoset film can be caused to function as a liquid crystal material alignment layer, that is, a layer in which a compound having liquid crystallinity is aligned.

In the irradiating method of polarized UV, usually, ultraviolet light to visible light having a wavelength of 150 to 450 nm are used and the irradiation is performed by irradiating the thermoset film at room temperature or in a heated state with linear polarized light in a vertical direction or an oblique direction.

The liquid crystal alignment layer formed from the thermoset film composition having photo-alignment properties of the present invention has solvent resistance and heat resistance, so that by applying a retardation material (a liquid crystal monomer, for example) onto the thus formed liquid crystal alignment layer and heating the resultant coating to a phase transition temperature of the liquid crystal, the retardation material is converted into a liquid crystal state, and by photo-curing this retardation material, a layer having optical anisotropy can be formed.

As the retardation material, for example, a liquid crystal monomer having a polymerizable group and a composition containing the same are used.

Such retardation materials have various alignment properties such as horizontal alignment, cholesteric alignment, vertical alignment, and hybrid alignment and such retardation materials can be used properly according to the necessary retardation.

When the base material on which the liquid crystal alignment layer formed from the thermoset film composition having photo-alignment properties of the present invention is formed, is a film, the film is useful as an optically anisotropic film.

By laminating two substrates having the liquid crystal alignment layer formed as described above via a spacer so that the liquid crystal alignment layers face each other via the spacer and by injecting a liquid crystal into between the two substrates, a liquid crystal display element in which a liquid crystal is aligned can also be prepared.

Therefore, the composition for forming thermoset film having photo-alignment properties of the present invention can be suitably used in various optically anisotropic films and various liquid crystal display elements.

Particularly, the composition for forming thermoset film having photo-alignment properties of the present invention can form a layer serving as both a liquid crystal alignment layer and a color filter overcoating (planarization layer), and an optical device containing such a layer and a retardation layer is also an object of the present invention.

The composition for forming thermoset film having photo-alignment properties of the present invention is useful also as a material for forming a cured film such as a protective film and an insulation film in various displays such as a thin film transistor (TFT) liquid crystal display element and an organic EL element, and is particularly suitable also as a material for forming an overcoating material of a color filter, an interlayer insulation film of a TFT liquid crystal element, an insulation film of an organic EL element, and the like.

EXAMPLES

The present invention will be described further in detail hereinafter referring to Examples, which should not be construed as limiting the scope of the present invention.

Abbreviations Used in Examples

The meanings of the abbreviations used in Examples below are as follows.
<Photo-Aligning Compound Containing Hydroxy Group>
  CIN 1: 4-(6-hydroxyhexyloxy)cinnamic acid methyl ester
  CIN 2: cinnamic acid 6-hydroxyhexyl ester
  CIN 3: 4-hydroxycinnamic acid methyl ester
  AZB 1: 4-(6-hydroxyhexyloxy)azobenzene
<Other Monomers (Compound Containing No Hydroxy Group)>
  CIN4: 4-(6-methacryloxyhexyloxy)cinnamic acid methyl ester
<Melamine Formaldehyde Resin>
  MHR1: methoxylated methylolmelamine formaldehyde resin (Mn: 511)
  MHR2: butoxylated methylolmelamine formaldehyde resin (Mn: 1,250)
<Crosslinker>
  HMM: hexamethoxymethylmelamine
  TMGU: 1,3,4,6-tetrakis(methoxymethyl)glycoluril
<Acid or Thermo-Acid Generator>
  PTSA: p-toluenesulfonic acid monohydrate
<Solvent>
  CHN: cyclohexanone
  NMP: N-methyl-2-pyrrolidone <Acrylic Copolymer: P1>

48.0 g of CIN 4, 12.0 g of MMA (methyl methacrylate), and 1.3 g of AIBN (azobisisobutyronitrile) as a polymerization catalyst were dissolved in 166.8 g of CHN and the resultant reaction solution was subjected to the reaction at 80° C. for 20 hours to obtain an acrylic copolymer (P1) solution (solid content concentration: 27% by mass). Mn and Mw of the obtained acrylic copolymer P1 were 8,700 and 18,000, respectively.

The number average molecular weight and the weight average molecular weight of the acrylic copolymer P1 were measured using a GPC apparatus (manufactured by JASCO Corporation; Shodex (registered trade mark) column KF 803L and KF 804L) under the condition of performing the elution by flowing an elution solvent tetrahydrofuran in the column (column temperature: 40° C.) at a flow rate of 1 mL/min. The number average molecular weight (hereinafter, called Mn) and the weight average molecular weight (hereinafter, called Mw) were expressed as a value in terms of polystyrene.

Example 1 to Example 6 and Comparative Example 1 to Comparative Example 3

Each of the compositions of Example 1 to Example 6 and Comparative Example 1 to Comparative Example 3 was prepared according to the formulation shown in Table 1 and each composition was subjected to the evaluations of solvent resistance, alignment properties, heat resistance, and transmittance.

TABLE 1

| | Component (A) (g) | Component (B) (g) | Component (C) (g) | Component (D) (g) | Solvent (g) |
|---|---|---|---|---|---|
| Example 1 | CIN 1 0.46 | MHR 1 1.37 | HMM 0.55 | PTSA 0.02 | CHN 17.5 |
| Example 2 | CIN 2 0.46 | MHR 1 1.37 | HMM 0.55 | PTSA 0.02 | CHN 17.5 |
| Example 3 | CIN 3 0.46 | MHR 1 1.37 | HMM 0.55 | PTSA 0.02 | CHN 17.5 |
| Example 4 | AZB 1 0.46 | MHR 1 1.37 | HMM 0.55 | PTSA 0.02 | CHN 17.5 |
| Example 5 | CIN 1 0.46 | MHR 2 1.37 | HMM 0.55 | PTSA 0.02 | CHN 17.5 |
| Example 6 | CIN 1 0.46 | MHR 2 1.37 | TMGU 0.55 | PTSA 0.02 | CHN 17.5 |
| Comparative Example 1 | CIN 4 0.46 | MHR 1 1.37 | HMM 0.55 | PTSA 0.02 | CHN 17.5 |
| Comparative Example 2 | P1* 10 | — | — | — | CHN 8 |
| Comparative Example 3 | CIN 1 0.46 | MHR 1 1.37 | — | — | CHN 16.5 |

*The Component (A) in Comparative Example 2 is expressed as the amount of the solution of P1 in grams.

Evaluation of Solvent Resistance

Each of the compositions of Example 1 to Example 6 and Comparative Example 1 to Comparative Example 3 was applied onto a silicon wafer using a spin coater and the resultant coating was prebaked on a hot plate at a temperature of 80° C. for 120 seconds to form a coating film having a film thickness of 1.1 µm. The film thickness was measured using F20 (manufactured by Filmetrics, Inc.). This coating film was postbaked on a hot plate at a temperature of 130° C. for 5 minutes to form a cured film having a film thickness of 1.0 µm.

This cured film was immersed in CHN or NMP for 60 seconds and was dried at a temperature of 100° C. for 60 seconds to measure the film thickness. A cured film that caused no change in the film thickness after the immersion in CHN or NMP was evaluated as "○" and a cured film in which a decrease of the film thickness after the immersion was observed was evaluated as "x".

Evaluation of Alignment Sensitivity

Each of the compositions of Example 1 to Example 6 and Comparative Example 1 to Comparative Example 3 was applied onto an ITO substrate using a spin coater and the resultant coating was prebaked on a hot plate at a temperature of 80° C. for 120 seconds to form a coating film having a film thickness of 1.1 µm. The film thickness was measured using F20 (manufactured by Filmetrics, Inc.). This film was postbaked on a hot plate at a temperature of 130° C. for 5 minutes to form a cured film.

This cured film was irradiated perpendicularly with linearly polarized light of 300 to 400 nm. Then, onto this cured film, a retardation material solution containing a liquid crystal monomer (manufactured by Merck KGaA; RMS03-013C) was applied using a spin coater and the resultant coating was prebaked on a hot plate at 80° C. for 60 seconds to form a coating film having a film thickness of 0.25 µm. This cured film and the substrate on which the coating film was formed was exposed to light with 1,000 mJ/cm$^2$ in a nitrogen atmosphere. The prepared substrate was sandwiched between deflection plates and the exposure dose of polarized UV at 313 nm required for the cured film to exhibit alignment properties was measured as the alignment sensitivity. The smaller the exposure dose is, the higher the alignment sensitivity is. A cured film causing no alignment by being irradiated with 1,000 mJ/cm$^2$ or more was evaluated as "not aligned".

Evaluation of Light Transmittance (Transparency)

Each of the compositions of Example 1 to Example 6 and Comparative Example 1 and Comparative Example 3 was applied onto a quartz substrate using a spin coater and the resultant coating was prebaked on a hot plate at a temperature of 80° C. for 120 seconds to form a coating film having a film thickness of 1.0 µm. The film thickness was measured using F20 (manufactured by Filmetrics, Inc.). This coating film was postbaked in a hot wind circulating-type oven at a temperature of 130° C. for 5 minutes to form a cured film.

The transmittance of this cured film relative to light having a wavelength of 400 nm was measured using an ultraviolet visible light spectrophotometer (manufactured by Shimadzu Corporation; trade name: Shimadzu UV-2550).

Results of Evaluation

The results of the evaluations are shown in Table 2 below.

TABLE 2

| | Solvent resistance | | Alignment sensitivity | Transmittance |
|---|---|---|---|---|
| | CHN | NMP | (mJ/cm$^2$) | (%) |
| Example 1 | ○ | ○ | 80 | 95 |
| Example 2 | ○ | ○ | 250 | 95 |
| Example 3 | ○ | ○ | 300 | 91 |
| Example 4 | ○ | ○ | 350 | 83 |
| Example 5 | ○ | ○ | 100 | 95 |
| Example 6 | ○ | ○ | 150 | 96 |
| Comparative Example 1 | X | X | Not aligned | 93 |
| Comparative Example 2 | X | X | 1,000 | 93 |
| Comparative Example 3 | X | X | Not aligned | — |

As shown in Table 2, a cured film obtained from each of the compositions of Example 1 to Example 6 exhibited resistance against any solvent of CHN and NMP and exhibited also extremely high transparency. Each cured film exhibited alignment properties with a small exposure dose.

A cured film obtained from each of the compositions of Comparative Example 1 and Comparative Example 2 failed to provide satisfactory solvent resistance and in each cured film, the alignment was not caused or the alignment sensitivity was lowered largely. The composition of Comparative Example 3 could not even form the film.

INDUSTRIAL APPLICABILITY

The composition for forming thermoset film having photo-alignment properties according to the present invention is extremely useful as a material for a liquid crystal alignment layer of an optically anisotropic film or a liquid crystal display element and is also suitable as a material for forming an overcoming and a liquid crystal alignment film of a color filter, a retardation film, and a patterned retardation film for a 3D liquid crystal display.

The invention claimed is:

1. A composition for forming thermoset film having photo-alignment properties, comprising:
a component (A) that is a compound consisting of at least one of the following formulae:

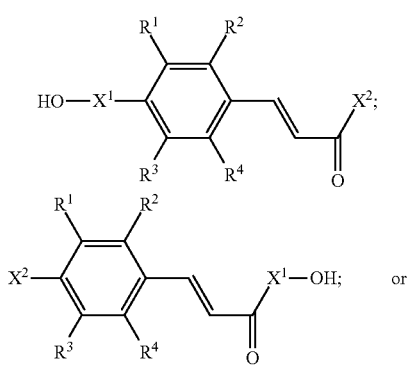

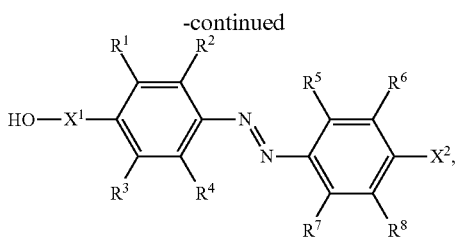

wherein $X^1$ is a single bond, a $C_{1-18}$ alkylene group, a phenylene group, a biphenylene group, or a cyclohexylene group bonded through a covalent bond, an ether bond, an ester bond, an amide bond, an amino bond, or a urea bond, and the alkylene group, the phenylene group, and the biphenylene group are optionally substituted with one or more substituents that are the same as or different from each other, and the one or more substituents are selected from the group consisting of a halogen atom and a cyano group, $X^2$ is a hydrogen atom, a cyano group, a nitro group, a $C_{1-18}$ alkyl group, a phenyl group, or a biphenyl group, and the $C_{1-18}$ alkyl group, the phenyl group, the biphenyl group, or the cyclohexyl group is optionally bonded to an adjacent carbonyl group or phenylene group through a covalent bond, an ether bond, an ester bond, an amide bond, an amino bond, or a urea bond and the phenyl group and the biphenyl group are optionally substituted with any one of a halogen atom or a cyano group, and $R^1$, $R^2$, $R^3$, $R^4$, $R^5$, $R^6$, $R^7$, and $R^8$ are independently a hydrogen atom, a $C_{1-4}$ alkyl group, a $C_{1-4}$ alkoxy group, a halogen atom, a trifluoromethyl group, or a cyano group;

a component (B) that is a melamine formaldehyde resin having a methylol group or an alkoxymethylol group; and a component (C) that is a crosslinker bonded with a hydroxy group of the compound that is component (A) and a methylol group or an alkoxymethylol group contained in the component (B), wherein the composition is curable by heating to form the thermoset film having photo-alignment properties.

2. The composition for forming thermoset film having photo-alignment properties according to claim 1, wherein the component (B) is a melamine formaldehyde resin having an alkoxymethylol group.

3. The composition for forming thermoset film having photo-alignment properties according to claim 1, wherein the crosslinker as the component (C) is a crosslinker having a methylol group or an alkoxymethylol group.

4. The composition for forming thermoset film having photo-alignment properties according to claim 1, further comprising:
as a component (D), an acid or a thermo-acid generator.

5. The composition for forming thermoset film having photo-alignment properties according to claim 1, further comprising:
as a component (E), a sensitizer.

6. The composition for forming thermoset film having photo-alignment properties according to claim 1, wherein the ratio between the component (A) and the component (B) is 5:95 to 60:40 in a mass ratio.

7. The composition for forming thermoset film having photo-alignment properties according to claim 1, wherein 10 to 100 parts by mass of the component (C), based on 100 parts by mass of the total amount of the component (A) and the component (B), is contained.

8. The composition for forming thermoset film having photo-alignment properties according to claim 4, wherein 0.01 to 5 parts by mass of the component (D), based on 100 parts by mass of the total amount of the component (A) and the component (B), is contained.

9. The composition for forming thermoset film having photo-alignment properties according to claim 5, wherein 0.1 to 20 parts by mass of the component (E), based on 100 parts by mass of the total amount of the component (A) and the component (B), is contained.

10. A liquid crystal alignment layer obtained using the composition for forming thermoset film having photo-alignment properties as claimed in claim 1.

11. An optical device comprising:
a layer serving as both a liquid crystal alignment layer obtained using the composition for forming thermoset film having photo-alignment properties as claimed in claim 1 and a color filter overcoating; and
a retardation layer.

* * * * *